(12) United States Patent
Felix (10) Patent No.: US 8,817,894 B2
(45) Date of Patent: Aug. 26, 2014

(54) METHOD AND DEVICE FOR SENDING SIGNALS BETWEEN A RADIO FREQUENCY CIRCUIT AND A BASEBAND CIRCUIT

(75) Inventor: Steve Felix, Bristol (GB)

(73) Assignee: Nvidia Technology UK Limited, London (GB)

( * ) Notice: Subject to any disclaimer, the term of this patent is extended or adjusted under 35 U.S.C. 154(b) by 232 days.

(21) Appl. No.: 13/582,695

(22) PCT Filed: Mar. 4, 2011

(86) PCT No.: PCT/EP2011/053295
§ 371 (c)(1),
(2), (4) Date: Sep. 4, 2012

(87) PCT Pub. No.: WO2011/107587
PCT Pub. Date: Sep. 9, 2011

(65) Prior Publication Data
US 2012/0328049 A1  Dec. 27, 2012

(30) Foreign Application Priority Data
Mar. 5, 2010  (GB) .................................. 1003703.4

(51) Int. Cl.
*H04B 15/04* (2006.01)
(52) U.S. Cl.
CPC ..................................... *H04B 15/04* (2013.01)
USPC .......................................................... 375/259
(58) Field of Classification Search
USPC .......................... 375/259, 145, 316, 267, 260
See application file for complete search history.

(56) References Cited

U.S. PATENT DOCUMENTS

| | | | |
|---|---|---|---|
| 6,169,889 B1 | 1/2001 | Servilio et al. | |
| 7,498,871 B2 | 3/2009 | Ruuswik | |
| 2004/0257124 A1* | 12/2004 | Araki et al. | 327/101 |
| 2005/0119025 A1 | 6/2005 | Mohindra et al. | |
| 2006/0023874 A1 | 2/2006 | Gilliland | |
| 2009/0147762 A1* | 6/2009 | Peng et al. | 370/342 |

FOREIGN PATENT DOCUMENTS

| | | |
|---|---|---|
| CN | 101421950 A | 4/2009 |
| CN | 101453240 A | 6/2009 |
| CN | 101453615 A | 6/2009 |
| WO | 2007118513 A1 | 10/2007 |
| WO | 2011107587 A1 | 9/2011 |

OTHER PUBLICATIONS

Chinese Office Action dated Jan. 24, 2014, 9 pages.

\* cited by examiner

*Primary Examiner* — Jaison Joseph (57) ABSTRACT

A method of sending a data signal and a clock signal between a radio frequency circuit of a device and a baseband circuit of the device. The method comprises: determining whether at least one of the data signal and the clock signal is disturbing in that it has a harmonic within the radio frequency band. If it is determined that at least one of the data signal and the clock signal is disturbing, the method further comprises: scrambling the at least one disturbing signal to flatten the spectrum thereof for frequencies below the clock frequency $F_C$, setting a respective at least one indicator to indicate that the at least one disturbing signal has been scrambled, and sending the at least one scrambled signal between the radio frequency circuit and the baseband circuit. The method further comprises, subsequent to the step of sending the at least one scrambled signal, descrambling the at least one scrambled signal if the respective at least one indicator is set.

24 Claims, 8 Drawing Sheets

METHOD AND DEVICE FOR SENDING SIGNALS BETWEEN A RADIO FREQUENCY CIRCUIT AND A BASEBAND CIRCUIT

CROSS-REFERENCE TO RELATED APPLICATION

This application is the National Stage of, and therefore claims the benefit of, International Application No. PCT/EP2011/053295 filed on Mar. 4, 2011, entitled "Method and Device for Sending Signals Between a Radio Frequency Circuit and a Baseband Circuit," which was published in English under International Publication Number WO 2011/107587 on Sep. 9, 2011, and has a priority date of Mar. 5, 2010, based on GB application 1003703.4. Both of the above applications are commonly assigned with this National Stage application and are incorporated herein by reference in their entirety.

FIELD OF THE INVENTION

The present invention relates to a method and a device for sending signals between a radio frequency circuit and a baseband circuit. In particular, the present invention relates to sending a data signal and a clock signal between the radio frequency circuit and the baseband circuit.

BACKGROUND

A device operating in a radio transmission system typically has a radio frequency circuit (e.g. an RF chip) and a baseband circuit (e.g. a baseband chip), with a link allowing data to be sent between the radio frequency circuit and the baseband chip. The radio frequency circuit typically includes at least one antenna for transmitting and receiving radio signals over the radio transmission system. The radio frequency circuit operates at radio frequencies (of the order of $10^9$ Hz) to transmit and receive the radio signals. The baseband circuit operates at the operating frequency of the device (typically of the order of $10^8$ Hz), in accordance with a clock signal (having a clock frequency $F_C$) provided in the device.

When a radio signal is received at the device it is typically demodulated in the radio frequency circuit to extract the data carried in the radio signal. The demodulated signal is then sent to the baseband circuit for use in the device. In some systems where the baseband circuit operates in the digital domain, the demodulated signal (which is an analogue signal) is passed through an analogue to digital converter in the radio frequency circuit before being sent to the baseband circuit over the link. Therefore digital signals are sent over the link. The demodulated data signal comprises at least one data stream signal (having a bit rate of $2F_C$) which can be sent over the link. In addition to sending the at least one data stream signal, a clock signal is sent over the link providing timing information allowing the baseband circuit to interpret the data stream signal(s).

Similarly, when signals are to be transmitted from the device via the antenna, the signals are sent from the baseband circuit to the radio frequency circuit over the link. The signal comprises a data signal (comprising at least one data stream signal) and a dock signal. On the radio frequency circuit the data signal is passed through a digital to analogue converter to convert the data signal into an analogue signal. The analogue signal is modulated in the radio frequency circuit and then transmitted over the radio transmission system from the device using the antenna.

One such system is described in the US patent application by Mohindra et al entitled "Serial Digital Interface for Wireless Network Radios and Baseband Integrated Circuits" published under publication number US 2005/0119025 A1 which discloses a system including a radio receiver integrated circuit, a radio transmitter integrated circuit and a baseband digital signal processing integrated circuit with a digital interface between the radio integrated circuits and the baseband digital signal processing integrated circuit.

The signals being sent on the link between the radio frequency circuit and the baseband circuit may generate spurious emissions, which may interfere with the transmission and reception of radio signals to and from the antenna. These spurious emissions add to the noise to which the radio signals are subjected at the antenna.

If strong noise is generated, within a radio frequency band at which the device is transmitting or receiving radio signals over the radio transmission system, by sending the clock signal or the data signal over the link, then there is a detrimental effect on the performance of the device.

It is an aim of the present invention to reduce detrimental effects of noise generated by the signals sent on the link between the radio frequency circuit and the baseband circuit.

SUMMARY

According to a first aspect of the invention there is provided a method of sending a data signal and a clock signal between a radio frequency circuit of a device and a baseband circuit of the device, the radio frequency circuit being configured for at least one of transmission and reception of radio signals in a radio frequency band, the clock signal having a clock frequency $F_C$, the method comprising:

determining whether at least one of the data signal and the clock signal is disturbing in that it has a harmonic within the radio frequency band, wherein if it is determined that at least one of the data signal and the clock signal is disturbing, the method further comprises:

scrambling the at least one disturbing signal to flatten the spectrum thereof for frequencies below the clock frequency $F_C$;

setting a respective at least one indicator to indicate that the at least one disturbing signal has been scrambled; and sending the at least one scrambled signal between the radio frequency circuit and the baseband circuit, wherein the method further comprises, subsequent to the step of sending the at least one scrambled signal, descrambling the at least one scrambled signal if the respective at least one indicator is set.

According to a second aspect of the invention there is provided a device comprising:

a radio frequency circuit configured for at least one of transmission and reception of radio signals in a radio frequency band; and a baseband circuit, the device being configured to send a data signal and a clock signal between the radio frequency circuit and the baseband circuit, the clock signal having a clock frequency $F_C$, the device being further configured to:

determine whether at least one of the data signal and the clock signal is disturbing in that it has a harmonic within the radio frequency band; and if it is determined that at least one of the data signal and the clock signal is disturbing:

scramble the at least one disturbing signal to flatten the spectrum thereof for frequencies below the clock frequency $F_C$;

set a respective at least one indicator to indicate that the at least one disturbing signal has been scrambled; and send the at least one scrambled signal between the radio frequency circuit and the baseband circuit, wherein the device is further configured to descramble the respective at least one scrambled signal subsequent to the at least one scrambled signal having been sent between the radio frequency circuit and the baseband circuit if the at least one indicator is set.

The total noise power emitted by the clock and data streams may be constant and depend only on their amplitudes. If certain strong frequency components of the noise spectrum of either the data signal or the clock signal affect the performance of the device under some circumstances (e.g. when operating the radio frequency circuit in certain frequency bands) then it can be useful to whiten the noise spectrum by flattening its spectrum over all frequencies from 0 to $F_C$ (thus affecting all higher frequency images). By flattening the spectrum the noise is spread over all frequencies. In other words, the noise is averaged out over frequencies below the clock frequency. For example if one of the harmonics of the clock signal falls into a radio frequency band at which the radio frequency circuit is transmitting or receiving radio signals via the antenna, then by flattening the spectrum the noise from the clock signal at that particular harmonic frequency is advantageously reduced.

Averaging the spectrum of the clock signal out increases the power level of the noise between the harmonic frequencies. Therefore, if it is determined that none of the harmonics of the clock signal affect the radio transmission/reception currently being used by the device then it could be detrimental to whiten the spectrum of the clock signal since at least some of the noise would be spread into the radio frequency band of interest. Similarly, it is not always beneficial to whiten the data-stream spectrum for the same reasons.

Two separate mechanisms for whitening the noise on the link can be enabled independently:
1) A data scrambling mechanism that whitens the spectrum of the data-streams; and
2) A mechanism that whitens the spectrum of the clock signal using one of the data streams In the following described embodiments, the system determines whether a harmonic of a noisy part of the data stream spectrum is affecting performance of the radio frequency circuit. If so, then the first mechanism described above (to whiten the spectrum of the data streams) is enabled. Independently, the system determines whether a harmonic of the clock signal is affecting performance of the radio frequency circuit. If so, then the second mechanism described above (to whiten the spectrum of the clock signal) is enabled.

If both a harmonic of the data stream spectrum and a harmonic of the clock signal are affecting performance of the radio frequency circuit then both mechanisms described above are enabled. Preferably, in this case the data stream is scrambled first and then the scrambled data stream is used to whiten the spectrum of the clock signal.

Whitening the spectrum of the disturbing signal over frequencies from 0 to $F_C$ is often preferable to reducing only the power of the disturbing harmonic in the signal, since the whitening mechanism is quick, easy to implement and requires little processing power. This allows the mechanism to be employed for real-time data transmissions over the radio transmission system and allows the mechanism to be used on small devices such as mobile phones or other mobile user devices which may not have much processing power or memory capacity.

The radio frequency circuit may be an RF chip and the baseband circuit may be a baseband chip. The RF chip and the baseband chip may be separate chips in the device. Alternatively, the radio frequency circuit and the baseband circuit may exist on the same physical chip in the device.

BRIEF DESCRIPTION OF THE DRAWINGS

For a better understanding of the present invention and to show how the same may be put into effect, reference will now be made, by way of example, to the following drawings in which.

DETAILED DESCRIPTION OF PREFERRED EMBODIMENTS

Figure 1:
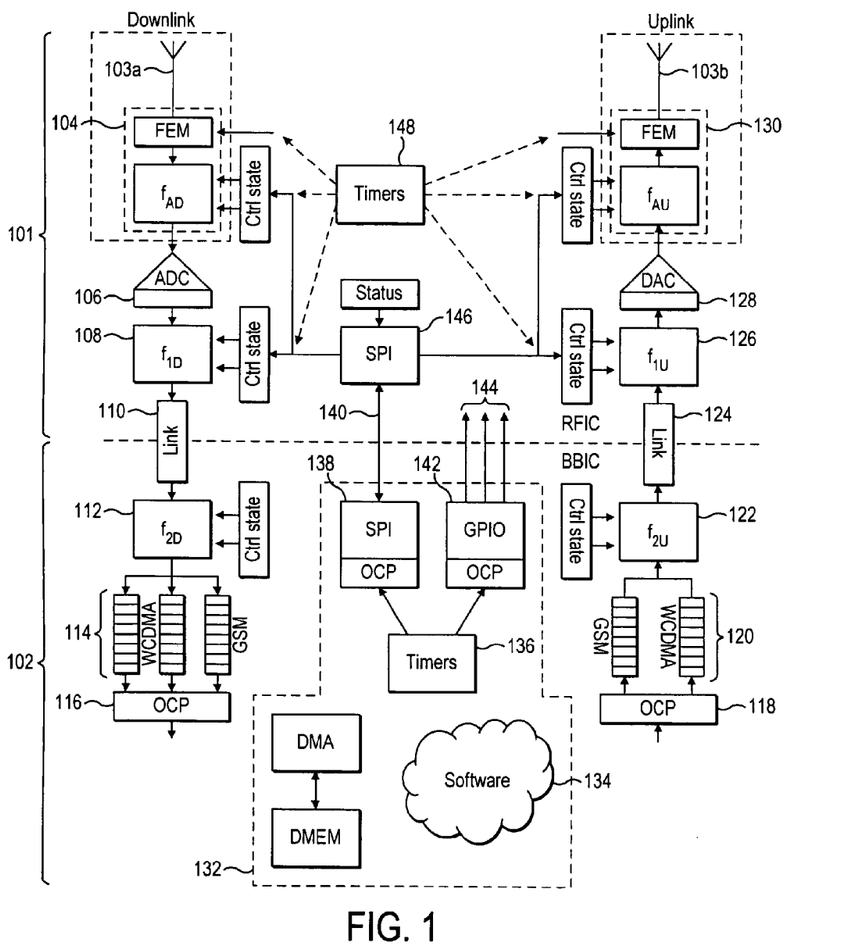
FIG. 1 is a schematic representation of a device according to a preferred embodiment.

With reference to FIG. 1 there is now described a preferred embodiment of the device 100. Device 100 comprises a radio frequency chip (RF chip) 101 and a baseband chip 102. The device 100 further comprises a receive antenna 103a for receiving radio signals from a radio transmission system and a transmit antenna 103b for transmitting radio signals over the radio transmission system. In preferred embodiments, the receive antenna 103a and the transmit antenna 103b are implemented as the same antenna. However, in other embodiments, the receive antenna 103a is separate from the transmit antenna 103b. The device 100 further comprises a downlink demodulation block 104 and an uplink modulation block 130. The RF chip 101 comprises an analogue to digital converter 106, a downlink RF sample rate converter 108, an uplink RF sample rate converter 126, a digital to analogue converter 128, a RF serial peripheral interface (SPI) block 146 and a RF timer block 148. The baseband chip 102 comprises a downlink BB sample rate converter 112, a plurality of downlink channels 114, a downlink open core protocol (OCP) block 116, an uplink open core protocol (OCP) block 118, a plurality of uplink channels 120 and an uplink BB sample rate converter 122. The device 100 further comprises system on chip components 132 comprising a software block 134, a BB timer block 136, a BB serial peripheral interface (SPI) block 138 and a general purpose input/output (GPIO) block 142. The device further comprises a downlink link 110, an uplink link 124, a SPI link 140 and GPIO links 144.

An output of the receive antenna 103a is coupled to an input of the downlink demodulation block 104. An output of the downlink demodulation block 104 is coupled to an input of the analogue to digital converter 106. An output of the analogue to digital converter 108 is coupled to an input of the downlink RF sample rate converter 108. An output of the downlink RF sample rate converter 108 is coupled to an input of the downlink BB sample rate converter 112 via the downlink link 110. Outputs of the downlink BB sample rate converter 112 are coupled to inputs of the downlink open core protocol (OCP) block 116 via the plurality of downlink channels 114. Outputs of the uplink open core protocol block 118 are coupled to inputs of the uplink BB sample rate converter 122 via the plurality of uplink channels 120. An output of the uplink BB sample rate converter 122 is coupled to an input of the uplink RF sample rate converter 126 via the uplink link 124. An output of the uplink RF sample rate converter 126 is coupled to an input of the digital to analogue converter 128. An output of the digital to analogue converter 128 is coupled to an input of the uplink modulation block 130. An output of the uplink modulation block 130 is coupled to an input of the transmit antenna 103b. The BB SPI block 138 is coupled to the RF SPI block 146 via the SPI link 140. The GPIO block 142 is coupled to the RF chip 101 via the GPIO links 144. The BB timer block 136 controls the timing of the BB SPI block 138 and the GPIO block 142. A first output of the RF SPI block 146 is coupled to an input of the downlink RF sample rate converter 108 and to an input of the downlink demodulation block 104. A second output of the RF SPI block 146 is coupled to an input of the uplink RF sample rate converter 126 and to an input of the uplink modulation block 130. The RF timer block 148 controls the timing of the downlink demodulation block 104, the downlink RF sample rate converter 108, the uplink RF sample rate converter and the uplink modulation block 130.

We now describe a broad overview of the operation of the device 100. Firstly, there is described the operation of the device when a radio signal is received at the receive antenna 103a. The radio signal is received from a radio transmission system in which the device 100 operates. The received radio signal is an analogue data signal which has been modulated to a radio frequency. The received radio signal is passed to the downlink demodulation block 104 where the radio signal is demodulated (using a conventional demodulation method as would be apparent to a skilled person), such that the output of the downlink demodulation block 104 is an analogue data signal.

The timing of the downlink demodulation block 104 is controlled by the RF timer block 148. The analogue data signal is passed to the analogue to digital converter 106 which converts the analogue data signal into a digital data signal and outputs the digital data signal to the downlink RF sample rate converter 108. The signal is passed over the downlink link 110 from the downlink RF sample rate converter 108 in the RF chip 101 to the downlink BB sample rate converter 112 in the baseband chip 102. The sample rate converters 108, 112, 122 and 126 contain no buffering, e.g. no FIFOs and no serial to parallel conversion. Downlink RF sample rate converter 108 is basically a low pass filter with a sigma delta modulator. This allows 1-bit sampling to be used across the downlink link 110, with no packetisation of the data signal, such that the downlink link 110 transfers a 1-bit serial stream on a channel.

The downlink link 110 comprises two identical RX channels (one main channel and one diversity channel). Each channel consists of an I and a Q path. Each channel path is built from two wires, which are a differential Low Voltage Differential Signalling (LVDS) pair. Thus, there are 8 wires in total for the downlink link 110, i.e. 2 channels each with 2 I/Q paths comprising 2 wires per LVDS pair). An interface clock is generated in the RF chip 101 and sent across to the baseband chip 102 as an LVDS signal, thereby using 2 wires. On the downlink link 110 the clock signal and the data signal are sent together. In other embodiments, the downlink link may comprise different numbers, and/or different types, of wires and be configured to transfer data and clock signals in a different manner as would be apparent to a person skilled in the art.

The timing of the downlink BB sample rate converter 112 is controlled using the BB timer block 136. The output of the downlink BB sample rate converter 112 comprises at least one digital data stream, synchronised with the clock signal generated by the BB timer block 136. The digital data streams are sent over the plurality of downlink channels 114 to the downlink OCP block 116. The downlink OCP block 116 provides an interface between the data signal(s) on the downlink channels 114 and the system on chip elements 132.

Secondly, we now describe a broad overview of the operation of the device 100 when signals are to be transmitted from the transmit antenna 103b. A digital data signal is fed into the uplink OCP block 118 from the on chip elements 132. The uplink OCP block 118 provides an interface between the data signal(s) on the downlink channels 114 and the system on chip elements 132. The data signal is passed via the uplink channels 120 to the uplink BB sample rate converter 122. The signal is passed over the uplink link 124 from the uplink RF sample rate converter 122 in the BB chip 102 to the uplink RF sample rate converter 126 in the RF chip 101. Uplink BB sample rate converter 122 is basically a low pass filter with a sigma delta modulator. This allows 1-bit sampling to be used across the uplink link 124, with no packetisation of the data signal, such that the uplink link 124 transfers a 1-bit serial stream on a channel.

There is a single channel on the uplink link 124 (i.e. there is no diversity channel as there is on the downlink link 110). The channel on the uplink link 124 comprises an I and a Q path. Each channel path comprises two wires, which are a LVDS pair. Thus, there are 4 wires in total on the uplink link 124, there being 2 I/Q paths each formed from 2 wires per LVDS pair. The clock signal received from the RF chip 101 at the baseband chip 102 is returned to the RF chip 101 using a 2 wire LVDS pair. On the uplink link 124 the clock signal is sent together with the data signal. In other embodiments, the uplink link may comprise different numbers, and/or different types, of wires and be configured to transfer data and clock signals in a different manner as would be apparent to a person skilled in the art.

The timing of the uplink BB sample rate converter 122 is controlled using the BB timer block 136, and the timing of the uplink RF sample rate converter 126 is controlled using the RF timer block 148. The data signal is output from the uplink RF sample rate converter block 126 and passed to the digital to analogue converter 128 where it is converted to an analogue signal. The analogue signal is then passed to the uplink modulation block 130 where it is modulated (using conventional techniques as would be apparent to the skilled person) and then transmitted over the radio transmission system via the transmit antenna 103b.

The SPI link 140 uses a 4-wire SPI interface for the delivery of control data into registers on the RF chip 101, and for reading back data from these registers to the baseband chip 102. A separate timing accurate strobe (TAS) signal is provided on the GPIO links 144 which is used to activate certain tasks on the RF chip 101 in a more accurate manner than is possible with the control data sent on the SPI link 140.

Figure 2:
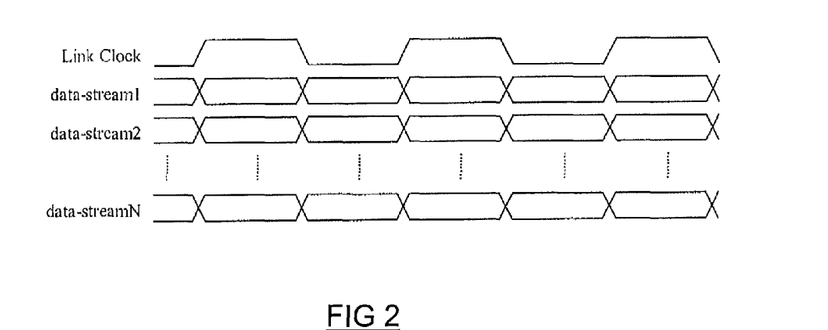
FIG. 2 is a timing diagram showing a clock signal and a plurality of data stream signals according to a preferred embodiment.

It will be appreciated that the signals passed over the downlink link 110 and the uplink link 124 are digital signals, since both the analogue to digital converter 106 in the downlink and the digital to analogue converter 128 in the uplink are situated in the RF chip 101. As described above, in order to send data signals over the downlink and uplink links (110 and 124) between the RF chip 101 and the baseband chip 102, a clock signal is used to provide the timing of the data signals. FIG. 2 shows a clock signal and a plurality of data streams being sent over the link (110 or 124). The clock signal has a clock frequency $F_C$ and the data bit boundaries on the data streams are defined by the transitions on the clock signal. Therefore the data stream signals have a bit rate of $2F_C$ bits per second.

The clock signal is approximately a square wave with frequency $F_C$. The spectrum of noise generated by the clock signal will comprise components at harmonics of the clock signal (i.e. at multiples of $F_C$). The fundamental frequency $F_C$ will contain the strongest component. Higher odd harmonics (e.g. with frequencies $3F_C$, $5F_C$, etc) will be weaker than the fundamental harmonic. If the clock signal was a perfect square wave (i.e. if it was perfectly symmetric) then the strength of the even harmonics (e.g. with frequencies $2F_C$, $4F_C$, etc) would be zero. However, in reality the clock signal will not be a perfect square wave and the strength of the even harmonics will depend on the duty cycle inaccuracy of the clock. Even very slight asymmetries in the clock signal can bring higher even harmonics into existence. It can therefore be assumed that even harmonics of the clock signal will exist to some extent.

The spectrum of noise generated by the data stream signals will depend (among other things) on the digital noise-shaper used to generate the bit-streams and the bit-stream rates. The data stream signals carry information as data bits, where transitions on the clock signal dictate data bit boundaries on the data stream signal. Therefore the highest noise frequency that a data stream signal (carrying a single bit stream) can generate has a frequency equal to the clock frequency $F_C$, which corresponds to the data bits in the data stream signal alternating on each clock transition (i.e. the data bits in the data stream signal are '01010101 . . . '). Frequency components lower than $F_C$ will be included in the data stream signal where the data bits do not alternate between every data bit boundary. For example, a data stream signal has a frequency of $$\frac{F_C}{2}$$

when it carries the data bits '001100110011 . . . '. The shape of the noise power spectrum of the data signal from frequencies 0 to $F_C$ will be mirrored and repeated at higher frequencies, decaying with increasing frequency at a rate that depends on the slew rate of the signal. Furthermore, the data stream signals may comprise two interleaved bit-streams, such as the in-phase and quadrature phase components (I and Q components) of a quadrature modulated signal. It will be apparent that interleaving of signals such as this will affect the spectrum of noise generated by the data stream signals.

As described above, the noise generated by the signals sent on the links (110 and 124) between the RF chip 101 and the baseband chip 102 may affect the performance of the radio transmission/reception from the antennas 103a and 103b. Since the clock signal has a regular frequency ($F_C$) the noise created by the clock signal will be much stronger at some frequencies (the harmonic frequencies) than at other frequencies. The same can be said of the data stream signals since they comprise data bits which can only change value after an integer number of half clock periods (i.e. after $$\frac{n}{2F_C} secs,$$

where n is an integer). If one of the harmonics of the data stream signals or the clock signal falls into the radio frequency band at which the antenna (103a or 103b) is operating then the performance of the device may be detrimentally affected.

A process of sending a data signal and a clock signal according to a preferred embodiment will now be described with reference to the flow chart shown in FIG. 3. Before signals are sent between the RF chip 101 and the baseband chip 102, in step S302 it is determined whether one of the data streams in the data signal is disturbing. A signal is "disturbing" if it has a harmonic which creates noise in a radio frequency band at which the antenna 103a or 103b is operating. In practice—data and clock whitening may be selected by software when specific bands or channels within bands are in use. To derive this software, lab measurements are preferably used to determine whether such whitening is beneficial or detrimental for each specific band or channel in a specific system. The circuit board layout topology, screening measures and density of the modem system can all have a significant impact on the levels of interference.

If it is determined in step S302 that one of the data stream signals is disturbing, the method passes to step S304. In step S304 an indicator (e.g. a bit in a data_scrambling register) is set in the device 100 to indicate that the data stream signal is to be scrambled. In the example described below in relation to FIGS. 4 and 7, the indicator comprises an enable_data_scrambling bit which is set in a register of the device 100 to indicate that the data signal should be scrambled before being sent over the link (110 or 124) and an enable_data_descrambling bit which is set in a register of the device 100 to indicate that the data signal should be descrambled after being sent over the link (110 or 124). The enable_data_scrambling bit and the enable_data_descrambling bit may be separate bits, or alternatively the same bit may be used for both purposes, and e.g. stored in the data_scrambling register.

From step S304 the method then passes to step S306 in which the disturbing data stream signal is scrambled. In this way, the noise spectrum of the data stream signal is modified. The data stream signal may be scrambled using any known scrambling technique as would be apparent to a skilled person. Different scrambling techniques will affect the noise spectrum of the data stream signal in different ways. The desired effect of scrambling the data stream signal is to reduce the noise from the data stream signal at frequencies within a radio frequency band at which the antenna 103a or 103b is operating. This is achieved by flattening the spectrum of the data stream signal. In other words the strengths of the frequency components of the data stream signal are averaged out over the frequency range 0 to $F_C$, i.e. for frequencies below the clock frequency. In this way, the spectrum of the data stream signal is whitened.

Figure 4:
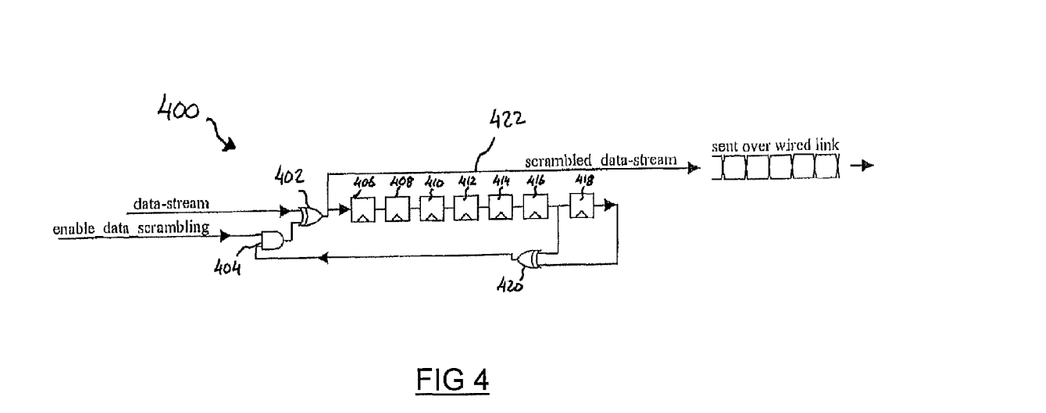
FIG. 4 is diagram of a circuit for scrambling a data signal according to a preferred embodiment.

FIG. 4 shows a data scrambling circuit 400 for scrambling the data stream signal according to a preferred embodiment. The data scrambling circuit 400 is situated at the sending end of the link (110 or 124) and is used to whiten the data stream noise spectrum. The data scrambling circuit 400 is a modified maximal length linear feedback shift register (LFSR) that is long enough to whiten the spectrum of the data stream signal appreciably. The data scrambling circuit comprises a first XOR gate 402, an AND gate 404, seven registers 406 to 418 and a second XOR gate 420. The data stream signal is coupled to a first input of the first XOR gate 402. A signal from the register storing the enable data scrambling bit is coupled to a first input of the AND gate 404. The output of the AND gate 404 is coupled to a second input of the first XOR gate 402. An output of the first XOR gate 402 is coupled to an input of the first register 406. An output of the first register 406 is coupled to an input of the second register 408. An output of the second register 408 is coupled to an input of the third register 410. An output of the third register 410 is coupled to an input of the fourth register 412. An output of the fourth register 412 is coupled to an input of the fifth register 414. An output of the fifth register 414 is coupled to an input of the sixth register 416. An output of the sixth register 416 is coupled to an input of the seventh register 418. The output of the sixth register 416 is also coupled to a first input of the second XOR gate 420. An output of the seventh register 418 is coupled to a second input of the second XOR gate 420. An output of the second XOR gate 420 is coupled to a second input of the AND gate 404. The output of the first XOR gate 402 provides the scrambled data stream signal on an output line 422 of the data scrambling circuit 400.

When the enable_data_scrambling bit is not set (i.e. there is a '0' on the first input to the AND gate 404) the output of the AND gate 404 is also '0'. Therefore the output of the first XOR gate 402 follows the data stream signal, such that when the data stream signal is a '1' the output of the first XOR gate 402 is a '1', but when the data stream signal is a '0' the output of the first XOR gate 402 is a '0'. Therefore the output of the data scrambling circuit 400 on output line 422 matches the incoming data stream signal, i.e. the data stream signal is not scrambled.

However, when the enable data scrambling bit is set (i.e. there is a '1' on the first input to the AND gate 404) the output of the AND gate 404 matches the value of the second input to the AND gate 404 which has come from the output of the second XOR gate 420. Therefore the value of the second input to the first XOR gate 402 depends upon the state of the registers 406 to 418. The output of the first XOR gate 402 will be a scrambled version of the data stream signal, which is output on the output line 422. The scrambling of the data stream signal is predictable if the scrambling circuit 400 is known. Therefore the device 100 is able to descramble a scrambled signal which has been scrambled using the data scrambling circuit 400.

Table 1 below provides an example to illustrate how data scrambling circuit 400 scrambles a data stream signal. In the example illustrated by Table 1 a data stream signal input to the first input of the first XOR gate 402 has data bits '1010001101001', where the left most bit in the sequence is the first to arrive at the circuit 400. Table 1 shows the state of the registers 406 to 418 and the outputs of the first and second XOR gates 402 and 420 on each clock pulse as the circuit 400 scrambles the data signal.

TABLE 1 an example of scrambling a data stream signal using the data scrambling circuit 400

| Clock pulse | data stream | output of 402 | 406 | 408 | 410 | 412 | 414 | 416 | 418 | output of 420 | output line 422 |
|---|---|---|---|---|---|---|---|---|---|---|---|
| initially |   | 0 | 0 | 0 | 0 | 0 | 0 | 0 | 0 | 0 | — |
| 1 | 1 | 1 | 1 | 0 | 0 | 0 | 0 | 0 | 0 | 0 | 1 |
| 2 | 0 | 0 | 0 | 1 | 0 | 0 | 0 | 0 | 0 | 0 | 0 |
| 3 | 1 | 1 | 1 | 0 | 1 | 0 | 0 | 0 | 0 | 0 | 1 |
| 4 | 0 | 0 | 0 | 1 | 0 | 1 | 0 | 0 | 0 | 0 | 0 |
| 5 | 0 | 0 | 0 | 0 | 1 | 0 | 1 | 0 | 0 | 0 | 0 |
| 6 | 0 | 0 | 0 | 0 | 0 | 1 | 0 | 1 | 0 | 0 | 0 |
| 7 | 1 | 1 | 1 | 0 | 0 | 0 | 1 | 0 | 1 | 1 | 1 |
| 8 | 1 | 0 | 0 | 1 | 0 | 0 | 0 | 1 | 0 | 1 | 0 |
| 9 | 0 | 1 | 1 | 0 | 1 | 0 | 0 | 0 | 1 | 1 | 1 |
| 10 | 1 | 0 | 0 | 1 | 0 | 1 | 0 | 0 | 0 | 1 | 0 |
| 11 | 0 | 1 | 1 | 0 | 1 | 0 | 1 | 0 | 0 | 0 | 1 |
| 12 | 0 | 0 | 0 | 1 | 0 | 1 | 0 | 1 | 0 | 0 | 0 |
| 13 | 1 | 1 | 1 | 0 | 1 | 0 | 1 | 0 | 1 | 1 | 1 |

It can be seen that, in this example, the scrambled data stream signal output on line 422 takes the value '1010001010101'.

Other data scrambling circuits may be used to scramble the data stream signal as would be apparent to a skilled person, with the particular circuit 400 shown in FIG. 4 being just one example of a suitable data scrambling circuit.

Figure 3:
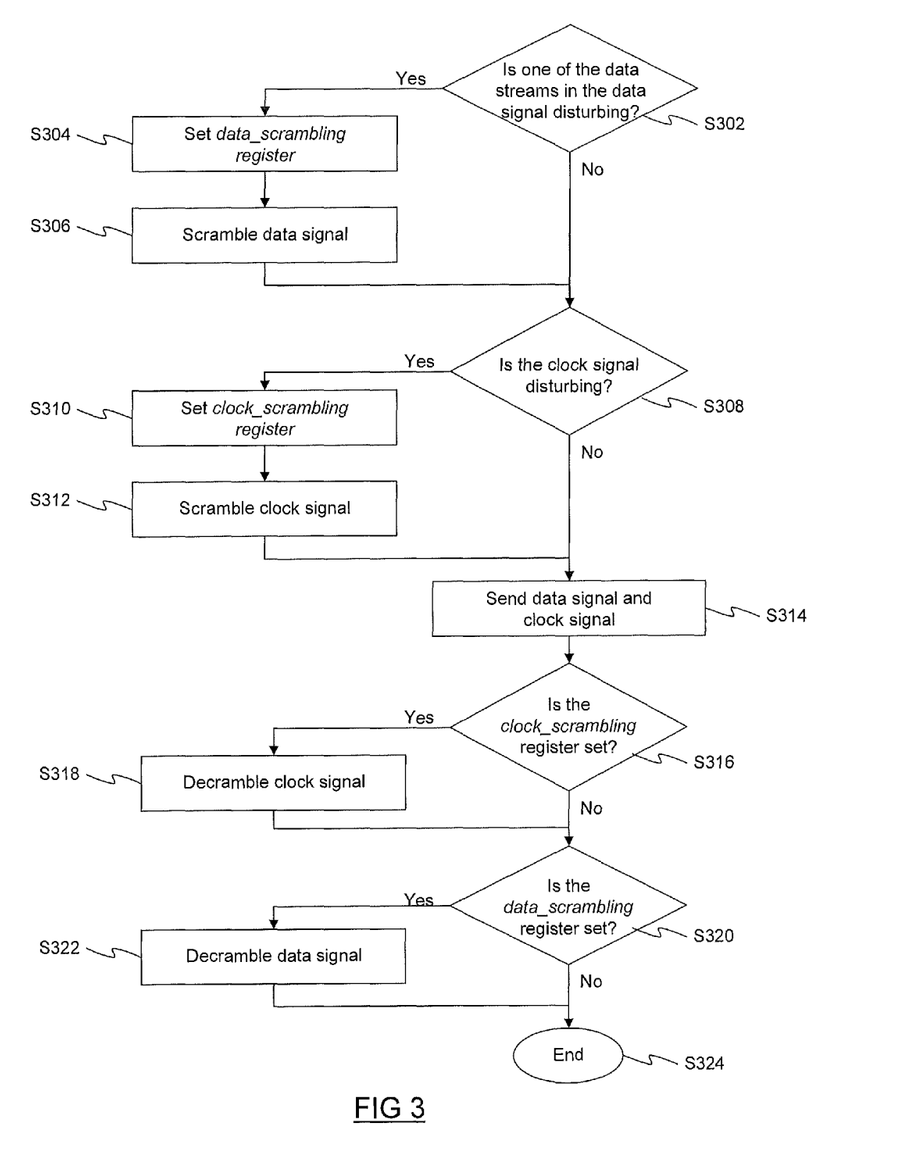
FIG. 3 is a flow chart for a process of sending a data signal and a clock signal according to a preferred embodiment.

Returning to the flow chart of FIG. 3, following step S306 the method passes to step S308. Furthermore, if it is determined in step S302 that none of the data stream signals are disturbing then the method passes straight to step S308. In step S308, before signals are sent between the RF chip 101 and the baseband chip 102, it is determined whether the clock signal is a disturbing signal. As described above, a signal is "disturbing" if it has a harmonic which creates noise in a radio frequency band at which the antenna 103a or 103b is operating. If it is determined in step S308 that the clock signal is disturbing, the method passes to step S310. In step S310 an indicator (e.g. a bit in a clock_scrambling register) is set in the device 100 to indicate that the clock signal is to be scrambled. In the example described below in relation to FIGS. 5 and 6, the indicator comprises an enable_clock_scrambling bit which is set in a register of the device 100 to indicate that the clock signal should be scrambled before being sent over the link (110 or 124) and an enable_clock_descrambling bit which is set in a register of the device 100 to indicate that the clock signal should be descrambled after being sent over the link (110 or 124). The enable_clock_scrambling bit and the enable_clock_descrambling bit may be separate bits, or alternatively the same bit may be used for both purposes, and e.g. stored in the clock scrambling register.

From step S310 the method then passes to step S312 in which the disturbing clock signal is scrambled. In this way, the noise spectrum of the clock signal is modified. The clock signal may be scrambled using any known scrambling technique as would be apparent to a skilled person. Different scrambling techniques will affect the noise spectrum of the clock signal in different ways. The desired effect of scrambling the clock signal is to reduce the noise from the clock signal at frequencies within a radio frequency band at which the antenna 103a or 103b is operating and this is achieved by flattening the spectrum of the clock signal. In other words the strengths of the frequency components of the clock signal are averaged out over the frequency range 0 to $F_C$, i.e. for frequencies below the clock frequency. In this way, the spectrum of the clock signal is whitened.

Figure 5:
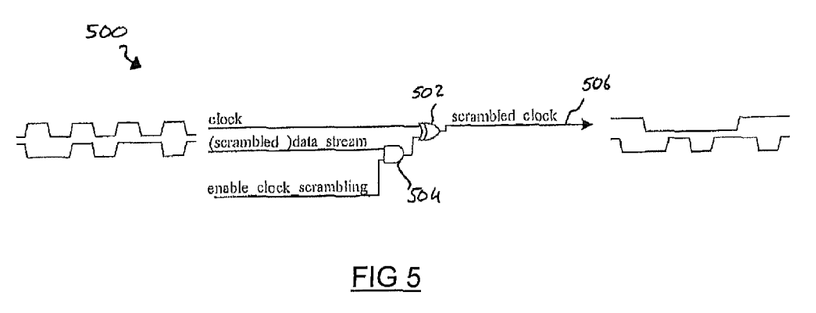
FIG. 5 is a diagram of a circuit for scrambling the clock signal according to a preferred embodiment.

FIG. 5 shows a clock scrambling circuit 500 for scrambling the clock signal according to a preferred embodiment. The clock scrambling circuit 500 is situated at the sending end of the link (110 or 124) and is used to whiten the clock noise spectrum. One of the data stream signals is selected and the clock scrambling circuit 500 scrambles the clock signal based on the selected data stream signal. Preferably a data stream signal that has been scrambled is selected, but alternatively an unscrambled data stream signal may be selected. The clock scrambling circuit 500 operates by toggling the scrambled clock signal only when the selected data stream signal does not toggle. The clock scrambling circuit comprises an XOR gate 502, an AND gate 504 and an output line 506. The clock signal is coupled to a first input of the XOR gate 502. The selected data stream signal is coupled to a first input of the AND gate 504. A signal from the register storing the enable_clock_scrambling bit is coupled to a second input of the AND gate 504. An output of the AND gate 504 is coupled to a second input of the XOR gate 502. An output of the XOR gate 502 provides the output signal on the output line 506.

In operation, when the enable clock scrambling bit is not set (i.e. there is a '0' on the second input to the AND gate 504) the output of the AND gate 504 is also '0'. Therefore the output of the XOR gate 502 follows the clock signal, such that when the clock signal is a '1' the output of the XOR gate 502 is a '1', but when the clock signal is a '0' the output of the XOR gate 502 is a '0'. Therefore the output of the clock scrambling circuit 500 on output line 506 matches the incoming clock signal, i.e. the clock signal is not scrambled.

However, when the enable_clock_scrambling bit is set (i.e. there is a '1' on the second input to the AND gate 504) the output of the AND gate 504 matches the value of the first input to the AND gate 504 which is the selected data stream signal. Therefore the value of the second input to the XOR gate 502 depends upon selected data stream signal. The output of the XOR gate 502 will be a scrambled version of the clock signal, which is output on the output line 506. In particular, the scrambled clock signal toggles when the selected data stream signal does not toggle as shown in FIG. 5. This can be thought of as giving the clock signal the mirror image of the noise spectrum of the selected data stream. The device 100 is able to descramble a scrambled clock signal which has been scrambled using the clock scrambling circuit 500.

The clock scrambling circuit 500 illustrated in FIG. 5 is simplified for clarity of function. In practice care must be taken to avoid generating glitches on the scrambled clock signal and to preserve the relative timing of the clock and data stream edges.

Returning to the flow chart of FIG. 3, following step S312 the method passes to step S314. Furthermore, if it is determined in step S308 that the clock signal is not disturbing then the method passes straight to step S314. In step S314, the data signal and the clock signal are sent over the link (110 or 124) between the RF chip 101 and the baseband chip 102. If the clock signal or data streams in the data signal have been scrambled then those scrambled signals are sent over the link in step S314.

Therefore, according to the method described so far, if the data signal or clock signal are disturbing then the disturbing signals are scrambled before being sent over the link between the RF chip 101 and the baseband chip 102. In this way, the noise, within a radio frequency band in which the device is transmitting or receiving signals over the radio transmission system, generated by sending the signals between the RF chip 101 and the baseband chip 102 is reduced.

After the signals have been sent, if they have been scrambled, they need to be descrambled. If the signals have not been scrambled then they do not need to be descrambled.

In step S316 it is determined whether the clock scrambling register stores an indication that the clock signal has been scrambled before being sent between the RF chip 101 and the baseband chip 102. In that case the method passes to step S318 in which the scrambled clock signal is descrambled. The method for descrambling the scrambled clock signal must be complementary to the method that was used to scramble the clock signal, in order to correctly descramble the clock signal.

Figure 6:
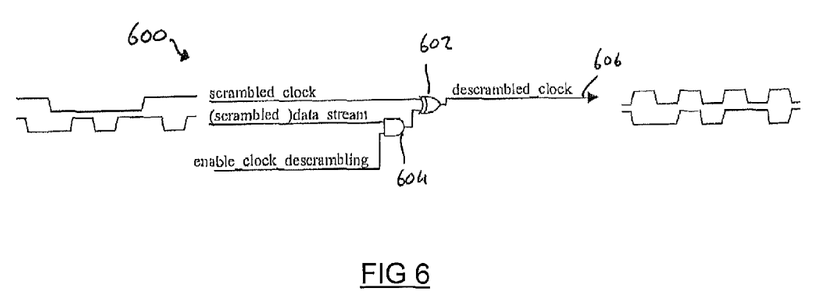
FIG. 6 is a diagram of a circuit for descrambling the scrambled clock signal according to a preferred embodiment.

For example, when the clock scrambling circuit 500 is used to scramble the clock signal, the clock descrambling circuit 600 shown in FIG. 6 may be used to descramble the clock signal. The clock descrambling circuit 600 illustrated in FIG. 6 is simplified for clarity of function. The data stream that was selected for scrambling the clock signal is used to descramble the clock signal.

The clock descrambling circuit 600 comprises an XOR gate 602, an AND gate 604 and an output line 606. The scrambled clock signal is coupled to a first input of the XOR gate 602. The selected data stream signal is coupled to a first input of the AND gate 604. A signal from the register storing the enable_clock_descrambling bit is coupled to a second input of the AND gate 604. An output of the AND gate 604 is coupled to a second input of the XOR gate 602. An output of the XOR gate 602 provides the output signal on the output line 606.

In operation, when the enable_clock_descrambling bit is not set (i.e. there is a '0' on the second input to the AND gate 604) the output of the AND gate 604 is also '0'. This indicates that the clock signal is not scrambled, and so the output of the XOR gate 602 follows the clock signal. Therefore the output of the clock descrambling circuit 600 on output fine 606 matches the incoming (not scrambled) clock signal.

However, when the enable_clock_descrambling bit is set (i.e. there is a '1' on the second input to the AND gate 604) the output of the AND gate 604 matches the value of the first input to the AND gate 604 which is the selected data stream signal. Therefore the value of the second input to the XOR gate 602 depends upon selected data stream signal. The output of the XOR gate 602 will be a descrambled version of the scrambled clock signal, which is output on the output line 606. In particular, the descrambled clock signal toggles when either the selected data stream signal or the scrambled clock signal toggles as shown in FIG. 6. The method then passes to step S320.

If in step S316 it is determined that the clock scrambling bit is not set then this indicates that the clock signal has not been scrambled before being sent between the RF chip 101 and the baseband chip 102. In that case the method passes straight to step S320 without descrambling the clock signal.

In step S320 it is determined whether the data_scrambling bit is set for each data stream in the data signal. If the data_scrambling bit is set then the data stream signal has been scrambled before being sent between the RF chip 101 and the baseband chip 102. In that case the method passes to step S322 in which the scrambled data stream signal is descrambled. The method for descrambling the scrambled data stream signal must be complementary to the method that was used to scramble the data stream signal, in order to correctly descramble the data stream signal.

Figure 7:
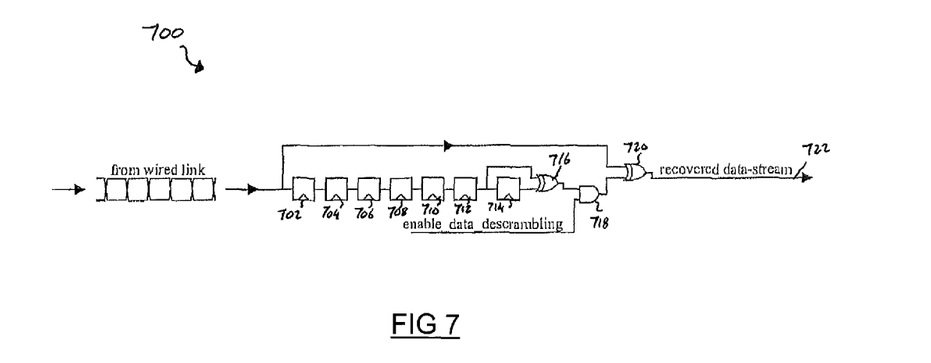
FIG. 7 is a diagram of a circuit for descrambling a scrambled data signal according to a preferred embodiment.

For example, when the data scrambling circuit 400 is used to scramble the data stream signal, the data descrambling circuit 700 shown in FIG. 7 may be used to descramble the data stream signal. The data descrambling circuit 700 illustrated in FIG. 7 is simplified for clarity of function.

The data descrambling circuit 700 comprises seven registers 702 to 714, a first XOR gate 716, an AND gate 718, a second XOR gate 720 and an output line 722. The scrambled data stream signal is coupled to an input of the first register 702 and to a first input of the second XOR gate 720. An output of the first register 702 is coupled to an input of the second register 704. An output of the second register 704 is coupled to an input of the third register 706. An output of the third register 706 is coupled to an input of the fourth register 708. An output of the fourth register 708 is coupled to an input of the fifth register 710. An output of the fifth register 710 is coupled to an input of the sixth register 712. An output of the sixth register 712 is coupled to an input of the seventh register 714. The output of the sixth register 712 is also coupled to a first input of the first XOR gate 716. An output of the seventh register 714 is coupled to a second input of the first XOR gate 716. An output of the first XOR gate 716 is coupled to a first input of the AND gate 718. A signal from the register storing the enable_data_descrambling bit is coupled to a second input of the AND gate 718. An output of the AND gate 718 is coupled to a second input of the second XOR gate 720. An output of the second XOR gate 720 provides an output on the output line 722.

In operation, when the enable_data_descrambling bit is not set (i.e. there is a '0' on the second input to the AND gate 718) the output of the AND gate 718 is also '0'. This indicates that the data stream signal is not scrambled, and the output of the second XOR gate 720 follows the data stream signal. Therefore the output of the data descrambling circuit 700 on output line 722 matches the incoming (not scrambled) data stream signal.

However, when the enable_data_descrambling bit is set (i.e. there is a '1' on the second input to the AND gate 718) the output of the AND gate 718 matches the value of the first input to the AND gate 718 which is provided by the output of the first XOR gate 716. The output of the first XOR gate 716 depends upon the state of the registers 702 to 714. The data descrambling circuit 700 is complementary to the data scrambling circuit 400, such that the output provided by the second XOR gate 720 on the output line 722 is the descrambled data stream signal.

Table 2 below provides an example to illustrate how data descrambling circuit 700 descrambles a scrambled data stream signal which has been scrambled using the data scrambling circuit 400. In the example illustrated by Table 2 a scrambled data stream signal has data bits '1010001010101', where the left most bit in the sequence is the first to arrive at the circuit 700. This example scrambled data stream signal is that which is output from the data scrambling circuit 400 in the example given in Table 1 above. Table 2 shows the state of the registers 702 to 714 and the outputs of the first and second XOR gates 716 and 720 on each clock pulse as the circuit 700 descrambles the scrambled data signal.

TABLE 2 an example of descrambling a scrambled data stream signal using the data descrambling circuit 700

| clock pulse | data stream | 702 | 704 | 706 | 708 | 710 | 712 | 714 | output of 716 | output of 720 | output line 722 |
|---|---|---|---|---|---|---|---|---|---|---|---|
| initially |   | 0 | 0 | 0 | 0 | 0 | 0 | 0 | 0 | 0 | — |
| 1 | 1 | 1 | 0 | 0 | 0 | 0 | 0 | 0 | 0 | 1 | 1 |
| 2 | 0 | 0 | 1 | 0 | 0 | 0 | 0 | 0 | 0 | 0 | 0 |
| 3 | 1 | 1 | 0 | 1 | 0 | 0 | 0 | 0 | 0 | 1 | 1 |
| 4 | 0 | 0 | 1 | 0 | 1 | 0 | 0 | 0 | 0 | 0 | 0 |
| 5 | 0 | 0 | 0 | 1 | 0 | 1 | 0 | 0 | 0 | 0 | 0 |
| 6 | 0 | 0 | 0 | 0 | 1 | 0 | 1 | 0 | 0 | 0 | 0 |
| 7 | 1 | 1 | 0 | 0 | 0 | 1 | 0 | 1 | 1 | 1 | 1 |
| 8 | 0 | 0 | 1 | 0 | 0 | 0 | 1 | 0 | 1 | 1 | 1 |
| 9 | 1 | 1 | 0 | 1 | 0 | 0 | 0 | 1 | 1 | 0 | 0 |
| 10 | 0 | 0 | 1 | 0 | 1 | 0 | 0 | 0 | 1 | 1 | 1 |
| 11 | 1 | 1 | 0 | 1 | 0 | 1 | 0 | 0 | 0 | 0 | 0 |
| 12 | 0 | 0 | 1 | 0 | 1 | 0 | 1 | 0 | 0 | 0 | 0 |
| 13 | 1 | 1 | 0 | 1 | 0 | 1 | 0 | 1 | 1 | 1 | 1 |

It can be seen that the descrambled data stream signal output on line 722 takes the value '1010001101001', which matches the data stream signal prior to scrambling with the data scrambling circuit 400 described above in relation to Table 1. It is therefore apparent that the data descrambling circuit 700 is complementary to the data scrambling circuit 400 in that a signal scrambled by the data scrambling circuit 400 can be obtained by descrambling the scrambled signal using the data descrambling circuit 700.

Other data descrambling circuits may be used to descramble the data stream signal as would be apparent to a skilled person, with the particular circuit 700 shown in FIG. 4 being just one example of a suitable data descrambling circuit, but the data descrambling circuit must be complementary to the data scrambling circuit used to scrambled the data stream signal.

After descrambling the data stream signal in step S322 the method ends in step S324. If in step S320 it is determined that the data_scrambling register does not indicate that the data stream has been scrambled then the method passes straight to step S324 in which the method ends. Therefore the method described above provides for sending the data stream signal and the clock signal between the RF chip 101 and the baseband chip 102 and for recovering the signals at the receiving end of the link (110 or 124), wherein the noise generated by the signals on the link (110 or 124) is flattened when it would otherwise have a harmonic within a radio frequency band at which the device is transmitting or receiving signals to/from the radio transmission system.

In some embodiments the data stream signal comprises of a plurality of bit streams. The bit streams are interleaved with each other. For example, the data stream signal may comprise I (the in phase component) and Q (the quadrature phase component) bit streams of a quadrature amplitude modulated signal. In these embodiments, the scrambling circuit 800 shown in FIG. 8 can be used to scramble the I and Q bit streams and the clock signal. The scrambling circuit 800 comprises a Q data scrambler 802, an I data scrambler 804, first to sixth registers 806 to 816, an AND gate 818, a NAND gate 820, a NOT gate 822, first and second multiplexers 824 and 826, a data output line 828 and a clock output line 830. The Q bit stream (the quadrature phase component of the data stream signal) is coupled to an input of the Q data scrambler 802. The I bit stream (the in phase component of the data stream signal) is coupled to an input of the I data scrambler 804. An output of the Q data scrambler 802 is coupled to an input of the first register 806. An output of the first register 806 is coupled to an input of the second register 808. An output of the second register 808 is coupled to a first input of the first multiplexer 824. An output of the I data scrambler 804 is coupled to an input of the third register 810. An output of the third register 810 is coupled to a second input of the first multiplexer 824. The output of the Q data scrambler 802 is coupled to a first input of the AND gate 818. The output of the I data scrambler 804 is coupled to a first input of the NAND gate 820. A signal from the register storing the clock_scramble_enable bit is coupled to a second input of the AND gate 818 and to a second input of the NAND gate 820. An output of the AND gate 818 is coupled to an input of the fourth register 812. An output of the fourth register 812 is coupled to an input of the fifth register 814. An output of the fifth register 814 is coupled to a first input of the second multiplexer 826. An output of the NAND gate 820 is coupled to an input of the sixth register 816. An output of the sixth register 816 is coupled to a second input of the second multiplexer 816. The clock signal is coupled to an input of the NOT gate 822. The first, third, fourth and sixth registers 806, 810, 812 and 816 are clocked using the output of the NOT gate 822. The second and fifth registers (808 and 814) are clocked using the clock signal and the first and second multiplexers (824 and 826) are controlled using the clock signal. The output of the first multiplexer 824 is provided on the data output link 828. The output of the second multiplexer 826 is provided on the clock output line 830.

Figure 8:
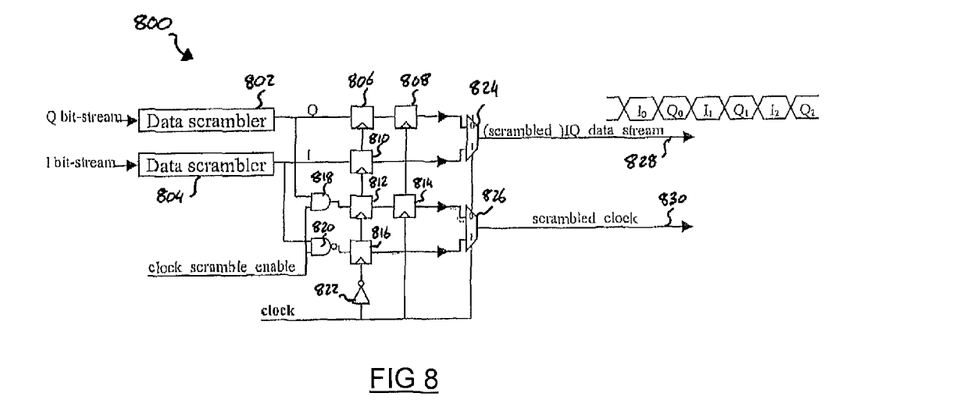
FIG. 8 is a diagram of a circuit for scrambling the clock signal according to another embodiment.

In operation, the data scramblers 802 and 804 scramble the bit streams using a data scrambling circuit such as that shown in FIG. 4 and described above. The two scrambled bit streams are interleaved by passing the Q bit stream through one more register than the I bit stream, such that the Q bit stream is delayed by half a clock cycle more than the I bit stream before arriving at the first multiplexer 824. The output of the first multiplexer 824 on data output line 828 is therefore an interleaved signal of the scrambled I bit stream and the scrambled Q bit stream.

When the clock_scramble_enable bit is not set (i.e. it is a '0') then the output of AND gate 818 is a '0' and the output of the NAND gate 820 is a '1'. It follows that the output from the second multiplexer 826 on clock output link 830 is a '1' when the clock signal is a '1' and is a '0' when the clock signal is a '0'. In other words the output on line 830 matches the clock signal.

When the clock_scramble_enable bit is set (i.e. it is a '1') then the output of AND gate 818 matches the Q bit stream from the Q data scrambler 802 and the output of the NAND gate 820 is the opposite of the I bit stream from the I data scrambler 804. In this way the output of the second multiplexer 826 is a scrambled version of the clock which has been scrambled based on the scrambled data stream signals. The scrambling process is predictable such that the clock signal can be recovered (i.e. descrambled) at the receiving end of the link (110 or 124).

Figure 9A:
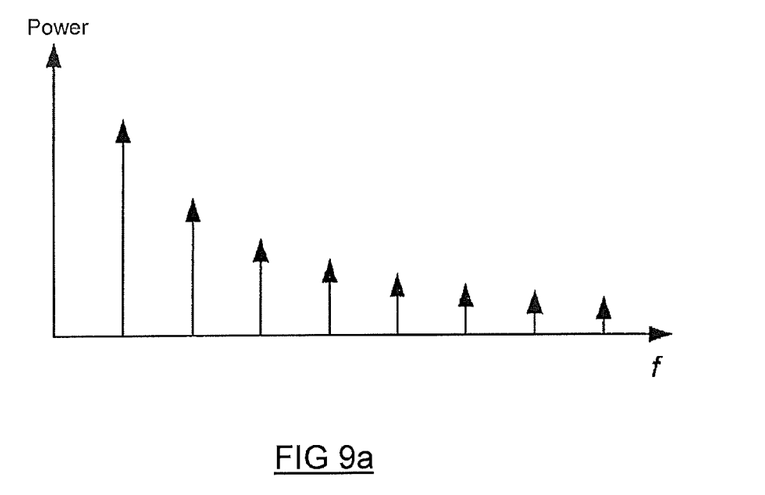
FIG. 9a is a graph qualitatively representing the noise spectrum generated by the clock signal.
Figure 9B:
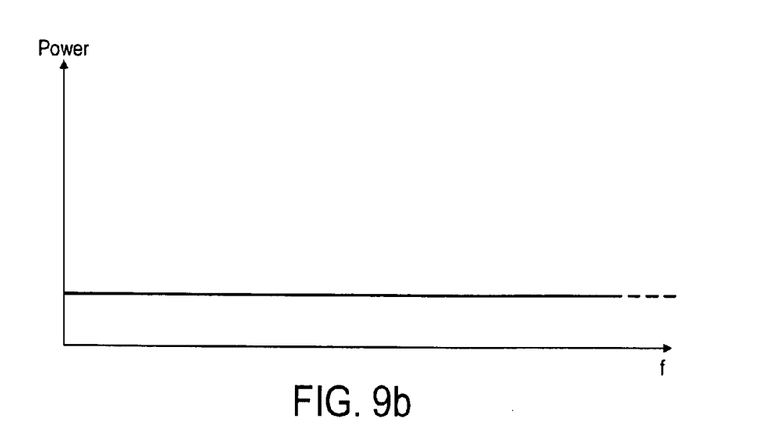
FIG. 9b is a graph qualitatively representing the noise spectrum generated by the scrambled clock signal.

FIG. 9a is a graph qualitatively representing the noise spectrum generated by the clock signal. It can be seen that the clock signal generates noise at well defined harmonic frequencies. FIG. 9b is a graph qualitatively representing the noise spectrum generated by the scrambled clock signal. It can be seen that after the clock signal has been scrambled the spectrum of the noise has been flattened, i.e. the noise spectrum has been whitened.

Figure 10A:
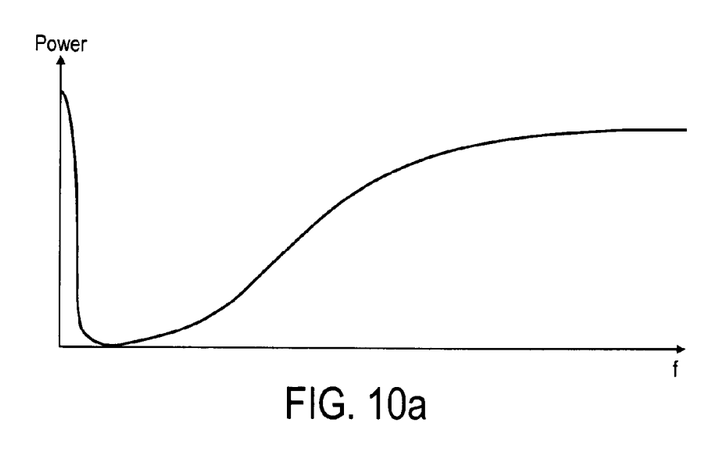
FIG. 10a is a graph qualitatively representing the noise spectrum generated by the data signal.
Figure 10B:
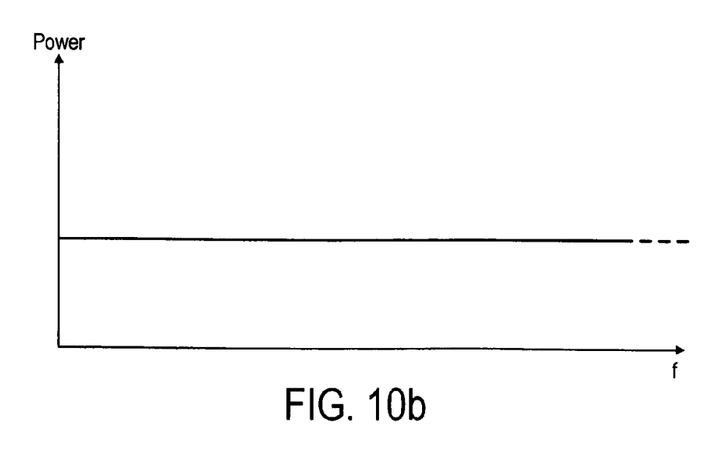
FIG. 10b is a graph qualitatively representing the noise spectrum generated by the scrambled data signal.

FIG. 10a is a graph qualitatively representing the noise spectrum generated by the data signal. FIG. 10b is a graph qualitatively representing the noise spectrum generated by the scrambled data signal. It can be seen that after the data signal has been scrambled the spectrum of the noise has been flattened, i.e. the noise spectrum has been whitened.

Figure 11:
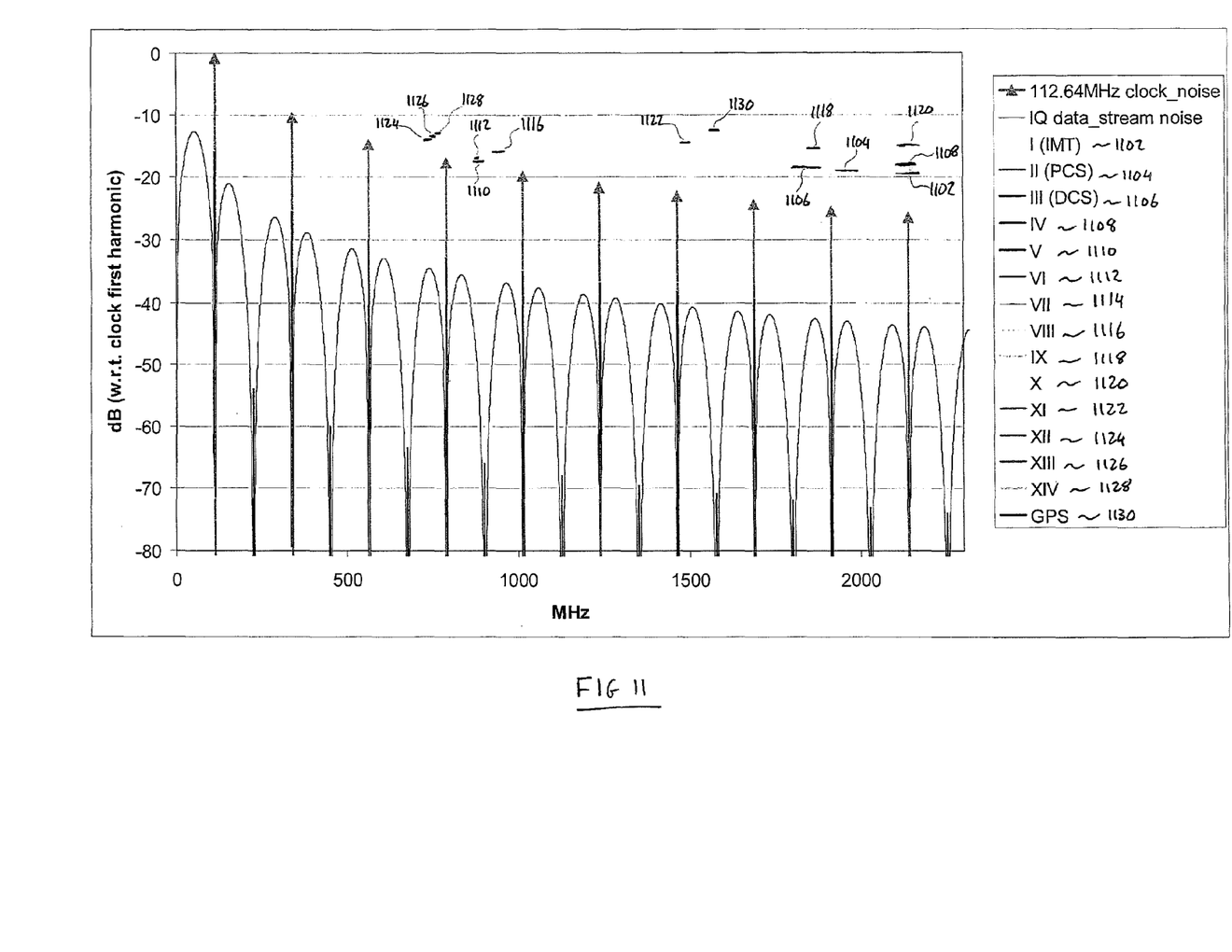
FIG. 11 is a graph representing the noise generated by the data and clock signals in relation to various frequency bands in which the device may transmit and receive over the radio transmission system.

FIG. 11 is a graph representing the noise generated by the data and clock signals in relation to various frequency bands in which the device may transmit and receive over the radio transmission system. The graph shown in FIG. 11 shows an example of the noise spectra of a 112.64 MHz link clock and IQ interleaved data streams without any scrambling and how they coincide with the downlink parts of particular radio bands. The different radio bands I to XIV and the GPS band are shown (labelled 1102 to 1130). It can be seen that the 19th clock harmonic (at 2140.16 MHz) could affect bands I, IV and X (labelled 1102, 1108 and 1120). In this example, scrambling the clock signal reduces the in-band clock noise in the bands I, IV and X.

The 7th image of the data stream noise at around 745 MHz could affect band XIII (labelled 1126). In this example, scrambling the data stream signal reduces the in-band noise in band XIII.

References herein to sending signals between the RF chip 101 and the baseband chip 102 include sending the signals from the RF chip 101 to the baseband chip (e.g. over downlink link 110) and also include sending the signals from the baseband chip 102 to the RF chip 101 (e.g. over uplink link 124).

While this invention has been particularly shown and described with reference to preferred embodiments, it will be understood to those skilled in the art that various changes in form and detail may be made without departing from the scope of the invention as defined by the appendant claims.

The invention claimed is:

1. A method of sending a data signal and a clock signal between a radio frequency circuit of a device and a baseband circuit of the device, the radio frequency circuit being configured for at least one of transmission and reception of radio signals in a radio frequency band, the clock signal having a clock frequency $F_C$, the method comprising:

determining whether at least one of the data signal and the clock signal is disturbing in that it has a harmonic within the radio frequency band, wherein if it is determined that at least one of the data signal and the clock signal is disturbing, the method further comprises:

scrambling the at least one disturbing signal to flatten the spectrum thereof for frequencies below the clock frequency $F_C$;

setting a respective at least one indicator to indicate that the at least one disturbing signal has been scrambled; and sending the at least one scrambled signal between the radio frequency circuit and the baseband circuit, wherein the method further comprises, subsequent to the step of sending the at least one scrambled signal, descrambling the at least one scrambled signal if the respective at least one indicator is set.

2. The method of claim 1 wherein the data signal comprises at least one data stream signal.

3. The method of claim 2 wherein one of said at least one data stream signals is one of the at least one disturbing signals.

4. The method of claim 3 wherein said at least one data stream signal comprises two interleaved bit streams.

5. The method of claim 4 wherein the two interleaved bit streams are an in phase component and a quadrature phase component of a quadrature amplitude modulated signal.

6. The method of claim 3 wherein said scrambling the at least one disturbing signal comprises passing the disturbing data stream signal through a linear feedback shift register.

7. The method of claim 6 wherein the linear feedback shift register is a maximal length linear feedback shift register.

8. The method of claim 6 wherein the step of descrambling the scrambled data stream signal comprises passing the scrambled data stream signal through a descrambling shift register which is complementary to the linear feedback shift register.

9. The method of claim 8 further comprising clocking the descrambling shift register using the clock signal sent with the scrambled data stream signal.

10. The method of claim 1 wherein the clock signal is one of the at least one disturbing signals, and wherein the step of scrambling the disturbing clock signal comprises scrambling the disturbing clock signal based on the data signal.

11. The method of claim 10, wherein each edge of the clock signal defines a data bit boundary on the data signal, the method further comprising selecting one of at least one data stream signals, and wherein the step of scrambling the disturbing clock signal comprises for each edge of the clock signal toggling the scrambled clock signal if, and only if, the selected data stream signal toggles at the corresponding data bit boundary.

12. The method of claim 11 wherein the step of descrambling the scrambled clock signal comprises toggling the descrambled clock signal every time either the selected data stream toggles or the scrambled clock signal toggles.

13. The method of claim 11 wherein if both the selected data stream signal and the clock signal are ones of said disturbing signals then the selected data stream signal is scrambled before the clock signal is scrambled such that the clock signal is scrambled based on the scrambled selected data stream signal.

14. The method of claim 1 wherein the at least one indicator comprises a respective at least one register.

15. The method of claim 1 wherein the data stream signal and the clock signal are sent between the radio frequency circuit and the baseband circuit as continuous bit streams.

16. The method of claim 1 wherein the data signal and the clock signal are sent between the radio frequency circuit and the baseband circuit on separate wired links.

17. The method of claim 1 wherein if it is determined that neither the data signal nor the clock signal has a harmonic within the radio frequency band then the method further comprises sending the data signal and the clock signal between the radio frequency circuit and the baseband circuit without scrambling either the data signal or the clock signal and without setting the at least one indicator.

18. A device comprising:
a radio frequency circuit configured for at least one of transmission and reception of radio signals in a radio frequency band; and
a baseband circuit,
the device being configured to send a data signal and a clock signal between the radio frequency circuit and the baseband circuit, the clock signal having a clock frequency $F_C$, the device being further configured to:
determine whether at least one of the data signal and the clock signal is disturbing in that it has a harmonic within the radio frequency band; and
if it is determined that at least one of the data signal and the clock signal is disturbing:
scramble the at least one disturbing signal to flatten the spectrum thereof for frequencies below the clock frequency $F_C$;
set a respective at least one indicator to indicate that the at least one disturbing signal has been scrambled; and
send the at least one scrambled signal between the radio frequency circuit and the baseband circuit,
wherein the device is further configured to descramble the respective at least one scrambled signal subsequent to the at least one scrambled signal having been sent between the radio frequency circuit and the baseband circuit if the at least one indicator is set.

19. The device of claim 18 further comprising a linear feedback shift register wherein the data signal is one of the at least one disturbing signals, the device being configured to pass the disturbing data signal through the linear feedback shift register to thereby scramble the disturbing data signal.

20. The device of claim 19 wherein the linear feedback shift register is a maximal length linear feedback shift register.

21. The device of claim 19 further comprising a shift register which is complementary to the linear feedback shift register for descrambling the scrambled data stream signal.

22. The device of claim 18 wherein the at least one indicator comprises a respective at least one register.

23. The device of claim 18 further comprising separate wired links for sending the data signal and the clock signal between the radio frequency circuit and the baseband circuit.

24. The device of claim 23 wherein the device is configured to send the data signal and the clock signal over the wired links as continuous bit streams.

* * * * *

UNITED STATES PATENT AND TRADEMARK OFFICE
CERTIFICATE OF CORRECTION

| | | |
|---|---|---|
| PATENT NO. | : 8,817,894 B2 | Page 1 of 1 |
| APPLICATION NO. | : 13/582695 | |
| DATED | : August 26, 2014 | |
| INVENTOR(S) | : Steve Felix | |

It is certified that error appears in the above-identified patent and that said Letters Patent is hereby corrected as shown below:

In the Specification

In column 1, line 60, after --and a-- delete the word "dock" and insert the word --clock--

Signed and Sealed this
Twenty-seventh Day of January, 2015

Michelle K. Lee
*Deputy Director of the United States Patent and Trademark Office*